United States Patent [19]
Ward, Jr.

[11] 3,754,596
[45] Aug. 28, 1973

[54] COOLING SYSTEM FOR MULTIPLE ELECTRICAL EQUIPMENTS

[75] Inventor: Clyde L. Ward, Jr., El Cajon, Calif.

[73] Assignee: The United States of America as represented by the Secretary of the Navy, Washington, D.C.

[22] Filed: Dec. 3, 1971

[21] Appl. No.: 204,435

[52] U.S. Cl. .................... 165/107, 165/137, 62/413, 317/100

[51] Int. Cl. ...... F28d 15/00, F25d 17/04, H01l 1/12

[58] Field of Search ....................... 62/298, 413, 418; 165/76, 107, 137; 236/1 E; 317/100 X; 174/15 R, 16 R

[56] References Cited

UNITED STATES PATENTS

| | | | |
|---|---|---|---|
| 2,787,768 | 4/1957 | Graham | 174/15 R X |
| 2,168,157 | 8/1939 | Crago | 236/1 E |
| 3,334,684 | 8/1967 | Roush et al. | 317/100 X |
| 3,396,780 | 8/1968 | Koltuniak et al. | 317/100 X |
| 3,124,720 | 3/1964 | Green | 317/100 |

*Primary Examiner*—Albert W. Davis, Jr.
*Assistant Examiner*—S. J. Richter
*Attorney*—R. S. Sciascia, G. J. Rubens et al.

[57] ABSTRACT

A plurality of electrical equipments mounted in separate enclosures is cooled by multiple heat exchanger units connected to a common path directing coolant from the heat exchanger units to each of the enclosures in which the electrical equipments are mounted. A separate path connected to each of the enclosures housing the electrical equipments provides a common return for directing the coolant from the electrical equipments to each of the heat exchangers after it has performed its cooling function. The multiple heat exchanger units thus connected in common paths for both directing the coolant to the electrical equipments and returning it from the electrical equipments provides all electrical equipments with sufficient coolant to maintain minimum operation even though one of the heat exchanger units malfunctions or is inoperative. Continuity of the functions performed by the plurality of electrical equipments connected in the cooling system is thus insured.

6 Claims, 1 Drawing Figure

PATENTED AUG 28 1973
3,754,596
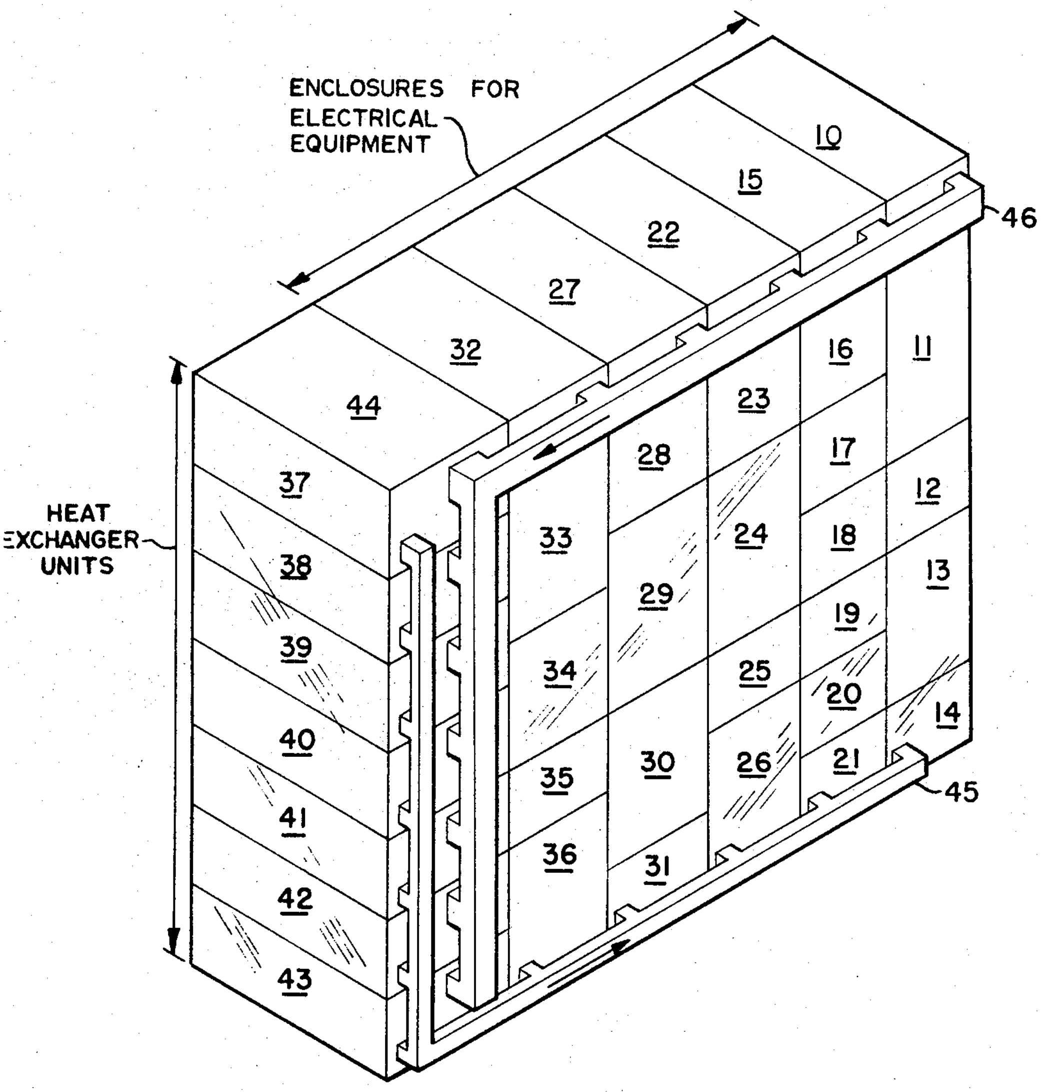
CLYDE L. WARD, JR.
*INVENTOR*
BY [signature]
[signature]

COOLING SYSTEM FOR MULTIPLE ELECTRICAL EQUIPMENTS

BACKGROUND OF THE INVENTION

Complex electrical and electronic equipments are customarily and conveniently supported and mounted in enclosures which may be of the rack type, for example, where separate modules or units are mounted one above another in a vertical arrangement to facilitate maintenance and the replacement of defective or inoperative units. The electrical equipments may preferably be mounted in sliding drawer type racks so that any one or more of the electrical equipments may be slindingly withdrawn from the enclosed cabinet to facilitate ease of access.

As is well known to those skilled in the art, such electrical and electronic equipments generate considerable heat when in operation and therefore must be maintained at a desirable temperature in order to insure long life and continuity of operation. In the prior art, cooling of electrical and electronic equipments has been achieved in several different ways. Where multiple electrical equipments are mounted in a common cabinet, it has sometimes been the conventional practice of the prior art to include a heat exchanger unit in each separate cabinet to cool each group of electronic or electrical equipments contained within each individual cabinet. This arrangement has the advantage of being a self-contained unit but also has the disadvantage which inheres by reason of endangering the operation of the group of electronic or electronical equipments within the cabinet should the heat exchanger malfunction or become inoperative to the extent that minimum cooling requirements are not maintained in that cabinet. As a consequence, the operation of those electrical equipments enclosed in a cabinet where a heat exchanger malfunction occurs, may reach an undesirably high temperature rendering that combination of electrical equipments inoperative.

For example, in such prior art arrangements the radio frequency portion of a system may be rendered inoperative by reason of the cooling unit in the rf section malfunctioning or becoming inoperative while the remainder of the system remains in an operative condition but its usefulness is lost. Similarly, a transmitter may remain in operation but the receiver portion of the same system be rendered inoperative by reason of the failure of the heat exchanger in the cabinet enclosure housing the receiver.

On the other hand, if the heat exchanger fails in the cabinet enclosure housing the power supply portion of a system, the entire system may be rendered inoperative and shut down by reason of the failure of the single heat exchanger in the power supply cabinet enclosure.

Another arrangement of the prior art is to connect a plurality of enclosures, each housing a number of different electrical or electronic equipments, through a common duct to a single large capacity heat exchanger unit. This has the advantage of eliminating the need for separate exchanger units since the capacity of the single large heat exchanger unit is so designed and chosen as to be adequate for all the electronic or electrical equipments contained within the plurality of cabinet enclosures commonly connected to the single large heat exchanger unit. However, the attendant disadvantage of this arrangement is that, if the single large heat exchanger unit is rendered inoperative, suffers a malfunction, or even diminishes a significant amount in its efficiency of operation, at least some, and in many cases all, of the electronic or electrical equipments which are commonly connected to receive coolant from the heat exchanger unit may be endangered and rendered functionally inoperative.

Moreover, in both the prior art systems and arrangements described above the cooling capacities of the heat exchanger units are for all practical purposes fixed as to the maximum capacity to perform cooling functions. That is to say, that where the individual heat exchanger units are each mounted in a separate cabinet enclosure there is usually if not always, a restriction on the amount of space which they may occupy and therefore their maximum cooling capacity may not be added to readily. As a result, if different electrical or electronic equipments are interchanged within a cabinet enclosure and require additional cooling, such additional cooling capacity may not always be available, nor readily provided.

In the case where a single heat exchanger unit is employed to meet the needs of multiple cabinet enclosurres, each of which house a number of different electronic equipments, the capacity to provide cooling is for all practical purposes fixed and cannot readily be enlarged nor added to for meeting additional cooling requirements as may be occassioned by the interchange of one or more electrical or electronic equipments housed in the plurality of cabinet enclosures.

It is therefore highly desirable that a cooling system be devised for maintaining the operative functionality of a plurality of electrical equipments mounted in separate enclosures in the event of partial impairment or malfunction of the cooling capability and that such cooling capability be so devised that it may readily be added to and its capabilities enlarged in the event that replaced or exchanged electrical or electronic equipments demand a greater cooling capacity.

SUMMARY OF THE INVENTION

The present invention comprises a system for cooling a plurality of electrical or electronic equipments mounted in separate enclosures such as rack-type cabinets, for example. A plurality of independently operative heat exchanger units are connected in common to a first duct. The first duct receives coolant from all the heat exchanger units and is connected to each of the enclosures for distribution of the coolant to all the electrical equipments contained within the enclosures.

A second duct is connected in common to all the enclosures housing the electrical equipments and also to each of the heat exchangers, forming a common return path for the coolant from all the electrical equipments contained within all the separate enclosures to each of the heat exchangers.

In a preferred embodiment the plurality of heat exchanger units may be mounted in a rack type cabinet enclosure of essentially the same type as the enclosures housing the electronic or electrical equipments. Accordingly, in the event of failure of one of the heat exchanger units, the remaining plurality of heat exchanger units which are commonly connected to cool all of the electronic equipments contained and housed within the several separate enclosures may be so designed as to provide sufficient cooling to maintain minimum operative functions of the plurality of electrical or electronic equipments.

Moreover, if, as in a preferred embodiment, the heat exchanger units are mounted in extensible rack type supports, an inoperative heat exchanger unit may be readily removed and another heat exchanger unit mounted in its place to restore the plurality of heat exchanger units to full functional capability.

Alternatively, a plurality of heat exchanger units may be mounted in a rack type cabinet enclosure to include one or more spare heat exchanger units so that the spare units may be employed to add to the cooling capacity of the commonly connected heat exchanger units as may be desired or necessary in the event of the addition or exchange of electronic or electrical equipment within the plurality of enclosures which are connected in common to the heat exchanger units. Such spare heat exchanger units may also be employed to replace malfunctioning or inoperative heat exchanger units which become wholly or partially inoperative to perform their cooling function.

Accordingly, it is a primary object of the present invention to provide a cooling system for a plurality of electrical equipment mounted within separate enclosures which insures the continued functional operation of the electrical equipments even though the heat exchanger means is partially incapacitated.

Another most important object of the present invention is to provide such a cooling system which is so conceived that its aggregate cooling capacity may be readily enlarged as desired.

A further most important object of the present invention is to provide such a cooling system wherein a partial impairment of the cooling capacity may be corrected conveniently by the replacement or exchange of one of a plurality of heat exchanger units without requiring shut-down of the entire combination of interrelated units.

These and other features, objects, and advantages of the present invention will be better appreciated from an understanding of the operative principles of a preferred embodiment as described hereinafter and as illustrated in the accompanying drawings.

BRIEF DESCRIPTION OF THE DRAWING

The drawing is an illustration of a preferred embodiment of the present invention and its interconnecting ducts shown in an isometric view.

DESCRIPTION OF THE PREFERRED EMBODIMENT

The drawing illustrates an isometric view of a preferred embodiment of the present invention, which comprises a plurality of electrical or electronic equipments mounted in separate enclosures. For example, the enclosure 10 may contain electrical equipments 11, 12, 13, and 14, while the enclosure 15 may contain electrical equipments 16, 17, 18, 19, 20, and 21. Similarly, the enclosure 22 houses electrical equipments 23, 24, 25, 26, while the enclosure 27 encloses four electrical equipments 28, 29, 30, and 31. Enclosure 32 houses and supports electronic or electrical equipments 33, 34, 35, and 36.

As may readily be seen by visual comparison, enclosures 10, 15, 22, 27, and 32 are all of similar outside dimensions and configurations, but each is appropriately divided so as to support, contain, and enclose electronic or electrical equipments of different sizes and different space requirements. The plurality of enclosures 10, 15, 22, 27, and 32 are disposed in a conventional array side-by-side, in a manner that is convenient for the interconnection of the multiple electrical equipments which they house.

A plurality of heat exchanger units 37, 38, 39, 40, 41, 42, and 43 are mounted, housed, and supported within a common cabinet 44. The heat exchanger units 37, 38, 39, 40, 41, 42, and 43 are connected in common to a first duct 45 which receives coolant from all the heat exchanger units and forms a common path connected to each of the enclosures 10, 15, 22, 27, and 32 for distribution of the coolant to all the electrical equipments contained, housed, and supported within the plurality of enclosures. A second duct 46 is connected to each of the enclosures 10, 15, 22, 27, and 32 housing and supporting the plurality of electrical equipments and forms a common return path for the coolant after it has performed its cooling function by contacting and flowing over and through each of the plurality of electrical equipments so that the coolant is returned to each of the heat exchangers, 37, 38, 39, 40, 41, 42, 43.

Preferably, the first duct 45 is connected to the lower portion of each of the enclosures housing a plurality of electrical equipments to take advantage of a normal convectional flow of the coolant. It is likewise desirable that the second duct 46 is connected to the upper portion of each of the enclosures 10, 15, 22, 27, and 32 for forming a common path to draw off the coolant after it has performed its cooling function by convectional flow. The coolant is then returned to all of the heat exchangers through the second duct 46, closing the loop of the overall system.

As will be apparent to those skilled and knowledgable in the pertinent arts, the coolant may comprise any appropriate fluid such as air, or another suitable gas, or a liquid as, for instance, in the form of water.

In a particular application of the concept of the present invention, especially where the required cooling capability can be satisfied by four or five heat exchanger units, the remaining heat exchanger units may be used as standby replacements to be interchanged with any one heat exchanger unit which malfunctions. Alternatively, any one or more of the additional units may be employed to add to the aggregate cooling capability of the commonly connected heat exchangers. Such increased cooling capacity may be required by the addition or exchange of electrical equipment to one or more of the plurality of enclosures 10, 15, 20, 22, 27, or 32.

One of the most desirable advantages of the concept of the present invention is that it employs a plurality of heat exchanger units thus minimizing shut-down of the electrical equipments contained in the plurality of cabinet enclosures 10, 15, 20, 22, 27, and 32 because of the very remote likelihood that all of the heat exchangers will malfunction simultaneously. Moreover, the concept of the present invention contemplates that the capabilities of the multiplicity of heat exchangers be so designed that the remaining operative heat exchangers are capable of furnishing sufficient cooling capacity so that minimum functionality of all the electrical equipments contained within the plurality of enclosures 10, 15, 22, 27, and 32 may be maintained for a predictable period of time despite the loss of one or more of the heat exchangers by reason of its malfunction or being rendered partially or wholly inoperative.

Thus, where it is critical in communications systems, for example, or military electronic equipments that a minimum functionality be maintained, such requirement can be assured by applying the concept of the present invention together with suitable design criteria ensuring sufficient coolant capacity in the event that the plurality of commonly connected heat exchanger units suffer one or more malfunctions.

Further, a malfunctioning or inoperative heat exchanger unit, when mounted in an extensible rack type arrangement as envisioned in the preferred embodiment, is readily accessible and quickly exchangable ensuring that all of the electronic or electrical equipments served by the group of heat exchangers may not only continue to operate without interruption, but are quickly returned to their full capacities by restoration of the full cooling function.

Obviously many modifications and variations of the present invention are possible in the light of the above teachings. It is therefore to be understood that within the scope of the appended claims the invention may be practiced otherwise than as specifically described.

What is claimed is:

1. A system for cooling a plurality of electrical equipments comprising:

separate, adjacently positioned enclosures, each adapted to support a number of said electrical equipments one above another in vertically disposed arrangement;

a plurality of heat exchanger units;

a first L-shaped duct connected in common to receive coolant from each of said heat exchanger units and forming a common path connected to the lower portion of each of said enclosures for distribution of said coolant to the electrical equipments within each said enclosure by convectional flow; and a second L-shaped duct connected to the top portion of each of the enclosures housing said electrical equipments and to each of said heat exchangers, forming a common path for the collection of said coolant after its convectional flow past said electrical equipments for return to each of said heat exchangers.

2. A system as claimed in claim 1 wherein the aggregate cooling capacity of said heat exchanger units is sufficient to insure the continuity of a predetermined level of operative functionality of all said electrical equipments upon the failure of a determinable number of said heat exchanger units.

3. A system as claimed in claim 1 wherein said heat exchangers are contained within a common enclosure.

4. A system as claimed in claim 1 wherein said coolant is air.

5. A system as claimed in claim 1 wherein said coolant is liquid.

6. A system as claimed in claim 5 wherein said coolant is water.

* * * * *